United States Patent [19]

Szczesny

[11] 4,322,175
[45] Mar. 30, 1982

[54] JOINT ASSEMBLY

[75] Inventor: Donald E. Szczesny, Sterling Heights, Mich.

[73] Assignee: TRW Inc., Cleveland, Ohio

[21] Appl. No.: 148,769

[22] Filed: May 12, 1980

[51] Int. Cl.³ .......................... F16C 11/00; F16D 1/12
[52] U.S. Cl. .................................... 403/134; 277/166; 277/212 FB
[58] Field of Search ................. 403/134, 36, 37, 38; 285/176; 411/371, 372, 544, 545, 533, 519; 277/166, 212 FB

[56] References Cited

U.S. PATENT DOCUMENTS

| | | | |
|---|---|---|---|
| 2,739,615 | 3/1956 | Wurzel | 411/519 X |
| 3,021,157 | 2/1962 | Moskovitz | 403/134 X |
| 3,262,706 | 7/1966 | Hassan | 403/134 |
| 3,310,326 | 3/1967 | Melone | 403/134 X |
| 3,322,445 | 5/1967 | Hassan | 403/134 |
| 3,403,932 | 10/1968 | Kutcher | 403/134 |
| 3,441,298 | 4/1969 | Herbenar et al. | 403/134 X |
| 3,476,417 | 11/1969 | Born et al. | 403/134 X |

FOREIGN PATENT DOCUMENTS 1006462 10/1965 United Kingdom ............... 403/134

Primary Examiner—Wayne L. Shedd
Attorney, Agent, or Firm—Yount & Tarolli

[57] ABSTRACT

An improved joint assembly has a boot seal with a retainer ring. The retainer ring is effective to hold the seal in place on a housing having a circular side surface with any one diameter in a range of diameters. The retainer ring includes an annular base having a plurality of interspersed groups of radially inwardly extending fingers or tabs. Each group of fingers includes fingers of different lengths to cooperate with housing side surfaces having different diameters within the range of diameters. Thus, each group of fingers includes a medium length finger which cooperates with a housing side surface having a diameter that falls within a middle portion of the range of diameters. Each group of fingers also includes a relatively short finger which cooperates with a housing side surface having a diameter which is greater than the mid-range diameter. Similarly, each group of fingers includes a relatively long finger which cooperates with a housing side surface having a diameter which is smaller than the mid-range diameter.

8 Claims, 6 Drawing Figures

JOINT ASSEMBLY

BACKGROUND OF THE INVENTION

Ball joints and other types of pivot joints are commonly provided with boot seals to prevent entry of dirt and other foreign materials into housing openings and to hold excess lubricant. The boot seal should be constructed in such a manner as to allow a small portion of the lubricant to escape without dislodging the seal. Several known boot seals which have been more or less satisfactory in their mode of operation are disclosed in U.S. Pat. Nos. 3,021,157; 3,262,706; 3,322,445; 3,403,932; 3,441,298; and 3,476,417.

In the past, difficulties have been encountered in using boot seals due to variations in the diameter of the housing with which the boot seal is associated. Unless the diameter of the outer side surface of the housing is held within a relatively small tolerance range, e.g., plus or minus 0.005 inches, the desired sealing relationship will not be obtained between the outer side surface and a boot seal. At the same time, cost considerations dictate that housings be forged or otherwise formed such that their outside surfaces have any diameter within a relatively wide tolerance range. The diameter of an as-forged housing surface may vary from a nominal diameter by as much as plus or minus 0.010 inches. Expensive machining of the outer side surface of the housing is thus required to achieve the relatively small tolerance range that insures the desired sealing relationship between the housing and a boot seal. The machining reduces the cost savings offered by forging the housings.

In an effort to position a boot seal automatically relative to an as-forged surface of a joint housing, it has been suggested that the seal could be provided with relatively short positioning fingers and relatively long retaining fingers. The relatively short positioning fingers engage the outer side surface of the housing to compensate for irregularities in the as-forged surface. The relatively long retaining fingers grip the side surface of the housing to hold the seal in place. The manner in which such a boot seal would cooperate with a joint housing is disclosed in U.S. Pat. No. 3,310,326.

SUMMARY OF THE PRESENT INVENTION

The present invention is a joint assembly having a boot seal which can cooperate with a circular housing side surface having any diameter within a range of diameters. The boot seal incorporates a retainer ring having a circular array of fingers or tabs. The circular array includes medium length fingers which are sized to engage a housing that has an actual diameter equal to the nominal housing diameter. Relatively long fingers are provided in the circular array to engage the sides of housings that have diameters smaller than the nominal diameter. Similarly, relatively short fingers are provided in the circular array to engage the sides of housings that have diameters larger than the nominal diameter.

Accordingly, it is an object of this invention to provide a new and improved joint assembly having a retainer which is effective to hold a seal on a housing when the housing's circular outer side surface has any diameter in a range of diameters.

Another object of this invention is to provide a new and improved joint assembly as set forth in the preceding object and wherein the retainer includes fingers of different lengths to cooperate with housing side surfaces having different diameters within the range of diameters.

Another object of this invention is to provide a new and improved seal assembly having a casing which is held in place by a retainer ring having fingers which are effective to grip housings of different sizes.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
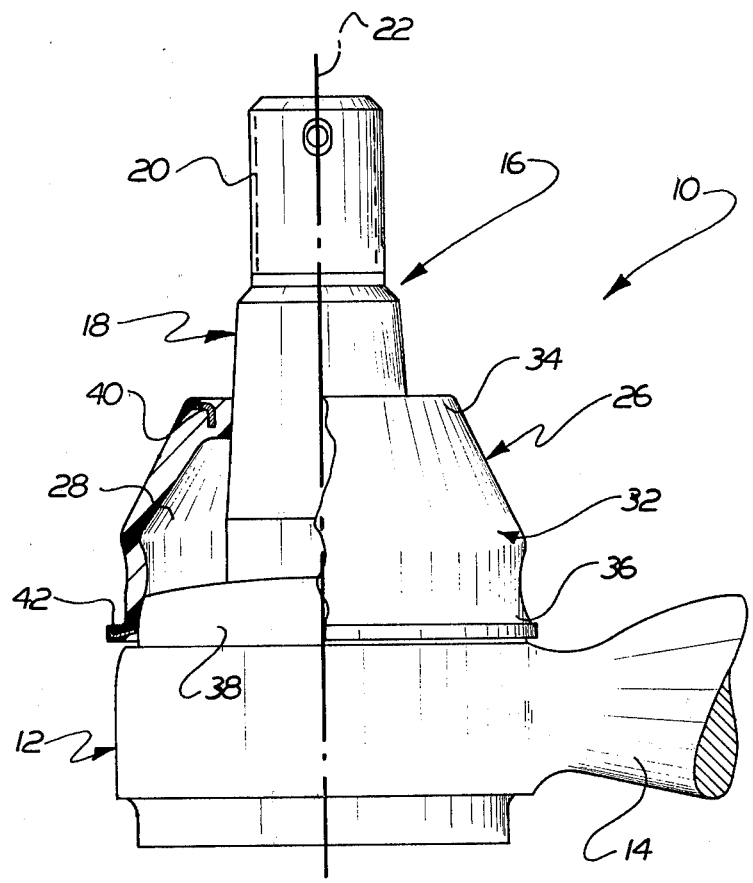
FIG. 1 is a partially broken away view of a joint assembly having a boot seal constructed in accordance with the present invention.

A ball and socket joint assembly 10 is illustrated in FIG. 1 and includes a metal housing 12 which is integrally forged with a portion of a steering link 14. A ball stud 16 has at one end a ball (not shown) that is enclosed by the housing 12. The shank 18 of the stud 16 is connected with the ball and extends away from the ball through a circular opening in the housing 12. The end portion 20 of the shank 18 opposite the ball is threaded for engagement with a steering link or support member.

The stud shank 18 can be pivoted in any direction about the center of the ball of the ball stud 16. In addition, the shank 18 is rotatable about its central longitudinal axis, which is shown as being coincident with the central axis 22 of the housing 12. As the stud shank 18 can be pivoted or tilted in any direction from the position shown, the shank's central axis may also be skewed relative to the central axis 22 of the housing. The ball stud 16 cooperates with the housing 12 in the manner described and illustrated in U.S. Pat. Nos. 4,035,095 and 4,102,585. The cooperation will not be further described in order to avoid prolixity of description, but the pertinent portions of U.S. Pat. Nos. 4,035,095 and 4,102,585 are incorporated herein by reference.

A flexible boot seal assembly 26 prevents the entry of dirt and other foreign materials into the housing 12 through the opening for the ball stud 16. In addition, the flexible boot seal assembly cooperates with the housing 12 and ball stud 16 to provide an annular chamber 28 in which excess lubricant is held. The boot seal assembly 26 is constructed in such a manner as to prevent the build up of excessive fluid pressure in the chamber 28.

The boot seal assembly 26 includes a flexible boot or casing 32 which encloses a portion of the housing 12 and is formed of a suitable polymeric material. The casing 32 has an upper end portion 34 which circumscribes the shank 18 of the ball stud 16 and a lower end portion 36 which circumscribes a generally cylindrical side surface 38 of the housing 12. The upper end portion 34 of the flexible casing 32 is held in tight sealing engagement with the outer side surface of the ball stud shank 18 by a circular upper metal retainer ring 40. The lower end portion 36 of the flexible boot or casing 32 is held in tight sealing engagement with the side surface 38 of the housing 12 by a circular lower retainer ring 42. The general manner in which the boot or casing 32 prevents the entry of dirt and other foreign materials into the opening in the socket housing 12 is well known and will not be further described herein.

In accordance with a feature of the present invention, the lower retainer ring 42 is effective to hold the boot 32 on the socket housing 12 so long as the circular side surface 38 has any diameter within a predetermined range of diameters. This feature enables the housing 12 to be used in an as-forged condition without accurate machining of the side surface 38.

During forging of the housing 12, the generally cylindrical, but slightly rounded, side surface 38 will be formed with a diameter that will vary within a tolerance range from a nominal diameter. Although different tolerance ranges could result from different socket assemblies and forging operations, it is contemplated that the retainer ring 42 will be used with a housing having a side surface 38 the diameter of which varies from a nominal diameter by as much as 0.010 inches. It should be understood that the foregoing tolerance range is specified for purposes of illustration only and that the invention is not limited to any specific tolerance range.

Figure 2:
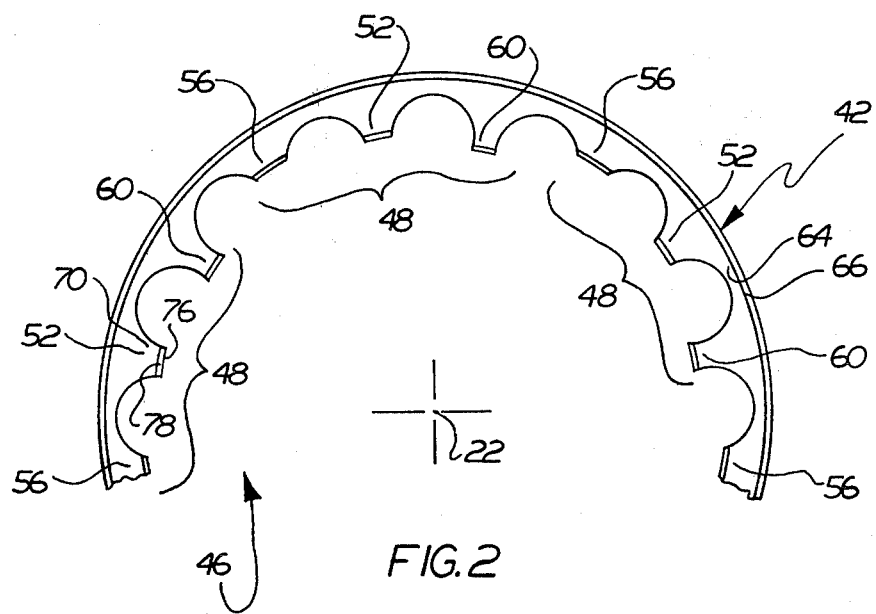
FIG. 2 is an enlarged fragmentary plan view of a retainer ring of the boot seal shown in FIG. 1.

The lower retainer ring 42 has a plurality of radially inwardly projecting fingers or tangs (see FIGS. 2 and 3) that are designed to grip socket housings having circular outer side surfaces 38 of any diameter within a range of diameters. Thus, the retainer ring 42 includes a circular array 46 of fingers or tangs which are arranged in a plurality of groups 48 (see FIG. 2). Although only a few of the groups 48 of retainer fingers are shown in FIG. 2, the retainer 42 has a complete circular array of retainer fingers 48. The half of the retainer ring 42 which is not illustrated in FIG. 2 is of the same general construction as the half of the ring which is illustrated.

Each group 48 of retainer fingers includes a medium length finger 52. The finger 52 is adapted to engage and grip a circular side surface 38 having a diameter which is equal to a nominal housing diameter, that is, the central diameter in a tolerance range for the housing. A housing side surface that has a diameter equal to the nominal housing diameter is designated by the numeral 38a in FIGS. 3 and 4.

Figure 3:
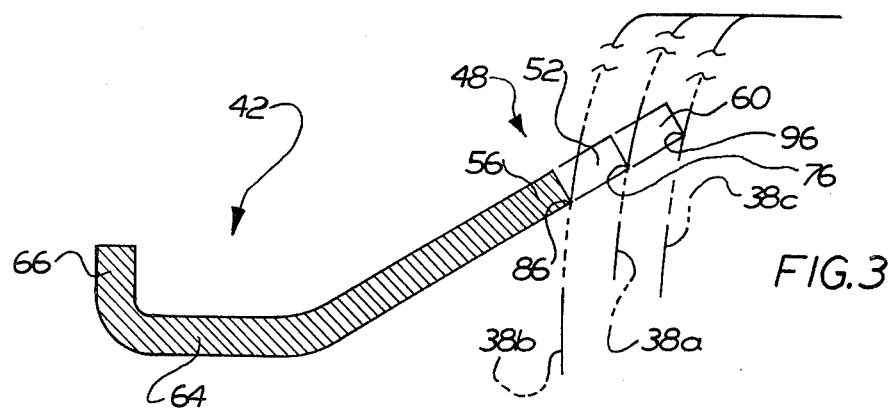
FIG. 3 is an enlarged schematic illustration depicting the manner in which the retainer ring of FIG. 2 cooperates with socket housings having circular side surfaces of a diameter equal to a nominal diameter, a diameter larger than the nominal diameter, and a diameter smaller than the nominal diameter.
Figure 5:
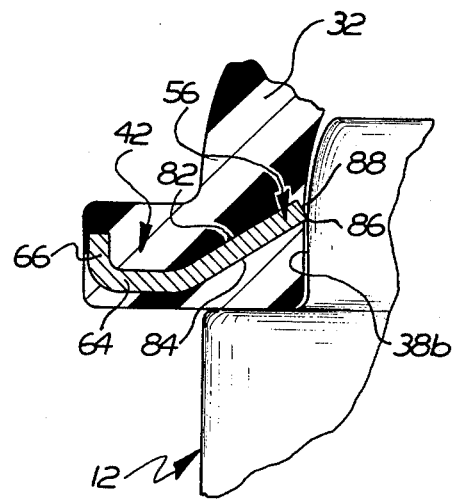
FIG. 5 is a fragmentary sectional view, generally similar to FIG. 4, illustrating the manner in which the boot seal of FIG. 1 cooperates with the circular side surface of a housing which has a diameter greater than the nominal diameter.

Each group of fingers 48 also includes a relatively short finger 56 (see FIGS. 2, 3 and 5). The finger 56 is shorter than the finger 52 and is adapted to engage and grip a circular side surface 38 of an oversize housing. Thus, the finger 56 is adapted to engage a housing side surface 38b that has a diameter larger than the diameter of the housing side surface 38a.

Figure 6:
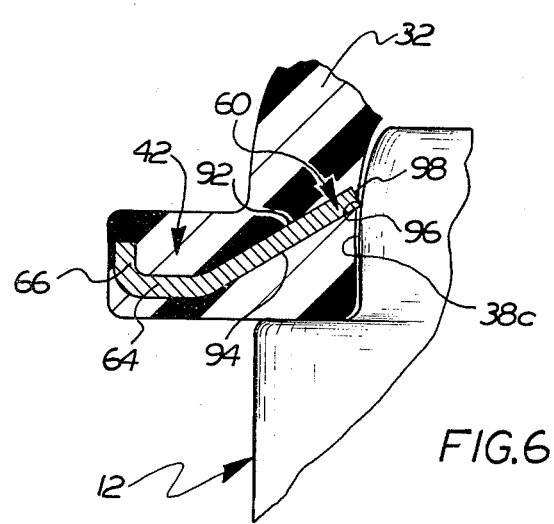
FIG. 6 is a fragmentary sectional view, generally similar to FIGS. 4 and 5, illustrating the manner in which the boot seal of FIG. 1 cooperates with the circular side surface of a housing which has a diameter less than the nominal diameter.

Finally, each group of fingers 48 includes a relatively long finger 60 (see FIGS. 2, 3 and 6). The finger 60 is longer than the finger 52 and is adapted to engage and grip a circular side surface 38 of an undersize housing 12. Thus, the finger 60 is adapted to engage a housing side surface 38c which has a diameter smaller than the diameter of the housing side surface 38a. It should be understood that although the housing side surface areas 38a, 38b and 38c of FIGS. 4, 5 and 6 all have different diameters, they are all representative of the same general surface area 38 (see FIG. 1) of a housing 12 which is formed to dimensions within a predetermined tolerance range.

The lower retainer ring 42 (FIGS. 2 and 3) also includes an annular base 64 having an upturned circular lip 66 which circumscribes the base. A plurality of each of the retainer fingers 52, 56 and 60 are interspersed in a circular array and extend radially inwardly from the annular base 64. As was previously mentioned, the medium length retainer fingers 52 have a length which enables them to engage the circular side surface 38a of a socket housing 12 which is forged to have an outer diameter equal to the nominal diameter within a tolerance range (see FIGS. 3 and 4). The relatively short fingers 52 (FIG. 2) are adapted to engage a housing having a side surface 38b with a diameter which is larger than the nominal diameter (see FIGS. 3 and 5). Finally, the relatively long fingers 60 (FIG. 2) are adapted to engage a socket housing having a side surface 38c with a diameter smaller than the nominal diameter.

Each medium length retainer finger 52 (FIG. 4) has flat upper and lower surfaces 70 and 72 which extend parallel to each other and are disposed in conical planes that have their centers at the central axis 22 (FIG. 1) of the housing 12. The upper and lower surfaces 70 and 72 extend at an angle of 60° to the central axis 22 of the housing, that is, at an angle of 30° to a radially extending plane. Although the angular orientation of the fingers 52 may be modified, it is believed that the illustrated acute angle of 30° to a radially extending plane best orients a corner 76 (FIG. 4) of each finger for locking engagement with the circular side surface 38a of a housing 12 having a diameter equal to the nominal diameter. The corner 76 is formed by the intersection of the lower finger surface 72 with an end surface 78 of the finger 52. Although only one of the medium or nominal length fingers 52 is shown in FIG. 4, all of the other fingers 52 in the circular array of fingers on the retainer ring 42 have the same construction and angular orientation.

The relatively short fingers 56 (FIG. 3) and the relatively long fingers 60 have the same construction and orientation as the fingers 52. However, the fingers 56 and 60 differ from the fingers 52 in that the extent to which they project radially from the base 64 of the retainer ring is different. This enables the fingers 56 and 60 to cooperate with socket housings that have different outer diameters within a predetermined tolerance range.

Thus, each relatively short finger 56 (FIG. 5) has upper and lower surfaces 82 and 84 which are disposed in conical planes having their centers at the central axis 22 of the socket housing 12. The surfaces 82 and 84 extend at the same acute angle relative to the central axis as do the side surfaces 70 and 72 (FIG. 4). Therefore, the side surfaces 82 and 84 (FIG. 5) are disposed in the same conical planes as are the side surfaces 70 and 72 of the medium size finger 52. The relatively short finger 56 is provided with a corner 86 at the intersection of the surface 84 and an end surface 88 to engage the relatively large diameter side surface 38b of the socket housing 12.

Figure 4:
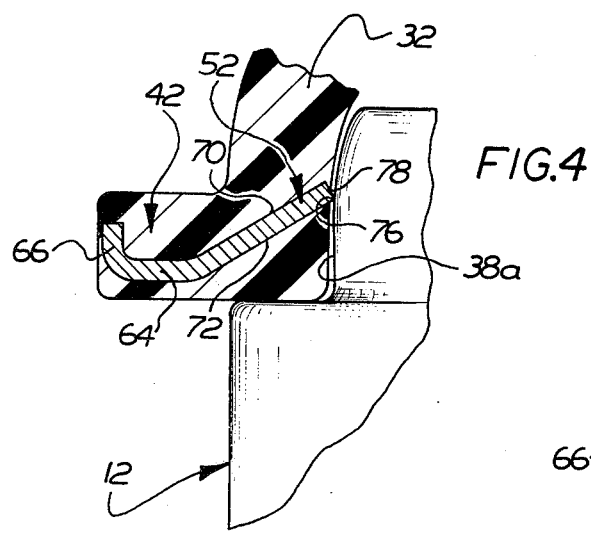
FIG. 4 is a fragmentary sectional view illustrating the manner in which the boot seal of FIG. 1 cooperates with the circular side surface of a housing which has a diameter equal to a nominal diameter.

Each relatively long finger 60 also has upper and lower surfaces 92 and 94 (FIG. 6) which are disposed in the same conical planes as the surfaces 70 and 72 of the medium length fingers 52 (see FIGS. 4 and 6). The relatively long finger 60 has a corner 96 which lockingly engages the relatively small diameter circular surface 38c of an undersized socket housing 12. The corner 96 is formed by the intersection of the surface 94 and an end surface 98 of the finger 60.

Each of the fingers 52, 56 and 60 obtains a similar locking action with a correspondingly sized housing n response to an upwardly directed (as viewed in FIG. 1) force on the boot 32 so as to hold the boot on the housing. Thus, if the boot 32 is associated with a housing having a side surface 38a with a diameter equal to the nominal diameter (see FIGS. 3 and 4) and is pulled upwardly (as viewed in FIG. 1), the corners 76 of the medium length fingers 52 tend to dig into the side wall 38a of the housing. This holds the retainer ring 42 firmly in place. Since the retainer 42 is formed of a resiliently deflectable metal, the retainer ring can flex somewhat under the influence of relatively large axial forces to permit the fingers 52 to bind on the housing surface 38a without being permanently deformed. When the axial force on the boot 32 is relieved, the retainer ring will spring back to its original position shown in FIG. 4.

With a housing having a diameter equal to the nominal diameter, the corners 86 of the relatively short fingers 56 are spaced from the housing. However, the relatively short fingers 56 do extend radially inwardly toward the housing side surface 38a and help to hold the lower portion 36 of the seal 32 in place. In addition, since the relatively short fingers 56 are spaced from the side surface 38a of the housing, excess lubricant can escape between the ends of the fingers and the housing if the fluid pressure in the cavity 28 becomes excessive. The relatively long fingers 60 will be cammed or deflected upwardly by the side surface 38a of the housing and will also help to hold the lower end portion 36 of the flexible boot 32 in place on the housing. However, the corners 96 of the fingers 60 probably will not dig into the side 38 of the housing when an axial force is applied to the boot 32.

When the socket housing 12 is oversize (see FIG. 5), the relatively short fingers 56 will be disposed with their corners 86 in abutting engagement with the circular side surface 38b of the housing. Therefore, upon the application of an upwardly directed (as viewed in FIG. 1) force on the flexible boot 32, the fingers 56 will tend to dig into the housing 12 to hold the boot in place.

With an oversize socket housing 12 (FIG. 5), the medium length fingers 52 and the relatively long fingers 60 will be deflected upwardly by the housing side surface 38b. Therefore, the corners 76 and 96 will tend not to dig into the housing when an axial force is applied to the boot 32. However, the medium length fingers 52 and the relatively long fingers 60 will help to hold the lower end portion 36 (FIG. 1) of the boot seal in place. Since the relatively long fingers 52 and 60 are deflected radially outwardly by the relatively large diameter side surface 38b in an oversized socket housing 12, they can be deflected somewhat further outwardly, when the fluid pressure in the cavity 28 (see FIG. 1) becomes excessive, to allow lubricant to escape from the cavity.

When the socket housing 12 is undersize (see FIG. 6), the corners 96 of the relatively long fingers 60 will tend to dig into the circular side surface 38c. However, the corners 76 and 86 of the medium length fingers 52 and relatively short fingers 56 will be spaced from the circular side surface 38c (see FIG. 6) of the undersize socket housing. Although the fingers 52 and 56 are spaced from the side surface 38c of the socket housing, they do extend inwardly toward the side surface 38c of the socket housing and help to hold the lower portion 36 of the seal in place.

Although the retainer ring 42 has been described herein in association with a specific type of joint, that is a ball and socket joint, the ring could be used with other types of joints. Also, more fingers could be provided in each group 48 of fingers. For example, two fingers of different lengths could be provided to engage undersize housings of different dimensions and two fingers of different lengths could be provided to engage oversize housings of different dimensions.

Having described one specific preferred embodiment of the invention, the following is claimed:

1. A joint assembly comprising a housing having a circular outer side surface which may have any diameter within a range of diameters, seal means for enclosing at least a portion of said housing, and retainer means for cooperating with said circular outer side surface of said housing to hold said seal means on said housing when said circular outer side surface has any one diameter in the range of diameters, said retainer means including first means for gripping said circular outer side surface of said housing when said one diameter is in a central portion of the range of diameters, second means for gripping said circular outer side surface of said housing when said one diameter is in the range of diameters and is larger than diameters in the central portion of the range of diameters, and third means for gripping said circular outer side surface of said housing when said one diameter is in the range of diameters and is smaller than diameters in the central portion of the range of diameters.

2. A joint assembly as set forth in claim 1 wherein said first gripping means includes a first plurality of fingers having a first length, said second gripping means includes a second plurality of fingers having a second length which is smaller than the first length, and said third gripping means includes a third plurality of fingers having a third length which is larger than the first length.

3. A joint assembly as set forth in claim 2 wherein said first, second and third pluralities of fingers are interspersed in a single circular array circumscribing said outer side surface of said housing.

4. A joint assembly as set forth in claim 3 wherein said first, second and third pluralities of fingers all extend radially inwardly at the same acute angle relative to a central axis of the circular array of fingers.

5. A joint assembly comprising a housing having a circular outer side surface which may have any diameter within a range of diameters, a stud projecting out of an opening in said housing and movable relative to said housing, and a seal assembly connected with said stud and said housing to prevent foreign particles from entering the opening in said housing, said seal assembly including a flexible casing and a retainer ring connected with said flexible casing, said retainer ring including an annular base and a plurality of groups of fingers extending radially inwardly from the annular base, each of said groups of fingers including a plurality of circumferentially spaced apart fingers that have different lengths so as to enable said fingers to cooperate with housing side surfaces having different diameters within the range of diameters, each of said groups of fingers including a relatively short finger adapted to cooperate with a housing side surface having a relatively large diameter within said range of diameters, a relatively long finger adapted to cooperate with a housing side surface having a relatively small diameter within said range of diameters, and a medium length finger adapted to cooperate with a housing side surface having a diameter intermediate the relatively large and small diameters.

6. A seal assembly for engaging a housing having a circular outer side surface which may have any diameter within a range of diameters, said seal assembly comprising a flexible casing for enclosing at least a portion of the housing and a retainer ring connected with the casing, said retainer ring having a series of inwardly projecting fingers, said series of fingers including a first plurality of fingers having surface means for gripping the outer side of the housing when the housing has a diameter in a central portion of the range of diameters, a second plurality of fingers having surface means for gripping the outer side of the housing when the housing has a diameter which is larger than diameters in the central portion of the range of diameters, and a third plurality of fingers having surface means for gripping the outer side of the housing when the housing has a diameter which is smaller than diameters in the central portion of the range of diameters.

7. A seal assembly as set forth in claim 6 wherein said fingers are resiliently deflectable by engagement with said housing.

8. A seal assembly as set forth in claim 6 wherein each finger of said first plurality of fingers has a first length, each finger of said second plurality of fingers has a second length which is smaller than the first length, and each finger of said third plurality of fingers has a third length which is larger than the first length.

* * * * *